United States Patent [19]
Thayer

[11] 3,953,553
[45] Apr. 27, 1976

[54] SEWAGE TREATMENT AERATION SYSTEMS

[75] Inventor: Paul M. Thayer, Milwaukee, Wis.

[73] Assignee: Water Pollution Control Corporation, Milwaukee, Wis.

[22] Filed: Feb. 28, 1975

[21] Appl. No.: 554,343

Related U.S. Application Data

[63] Continuation of Ser. No. 364,585, May 29, 1973, abandoned.

[52] U.S. Cl. .............................. 261/122; 285/286
[51] Int. Cl.² ........................................... B01F 3/04
[58] Field of Search ............... 261/121 R, 122–124, 261/DIG. 47; 285/19, 189, 286

[56] References Cited
UNITED STATES PATENTS

| | | |
|---|---|---|
| 1,138,228 | 5/1915 | Kindervater .................. 285/286 X |
| 1,457,183 | 5/1923 | Mitchell ........................ 285/286 X |
| 1,780,978 | 11/1930 | Lutzow ............................. 285/286 |
| 1,792,928 | 2/1931 | Reigart ......................... 285/286 X |
| 2,221,346 | 11/1940 | Durdin, Jr. ......................... 261/124 |
| 2,361,636 | 10/1944 | Koppel .......................... 285/286 X |
| 2,986,382 | 5/1961 | Langdon ............................. 261/124 |
| 3,424,443 | 1/1969 | Thayer ............................... 261/123 |
| 3,615,078 | 10/1971 | Thayer ............................... 261/123 |
| 3,738,628 | 6/1973 | Nechine ............................. 261/122 |

Primary Examiner—Tim R. Miles
Assistant Examiner—Richard L. Chiesa
Attorney, Agent, or Firm—Pollock, Vande Sande & Priddy

[57] ABSTRACT

An aeration system for a sewage treatment plant, including headers having diffuser connectors longitudinally spaced along the header, the connectors having nipples formed thereon which are welded to nipples formed on the header.

9 Claims, 10 Drawing Figures

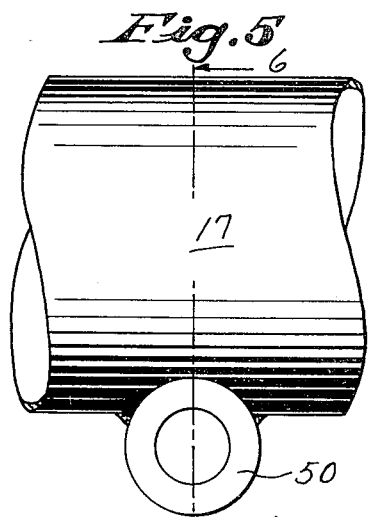
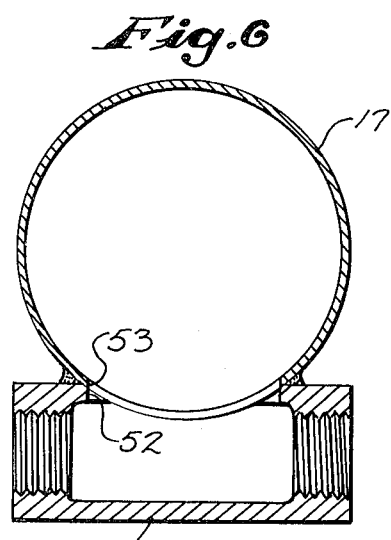
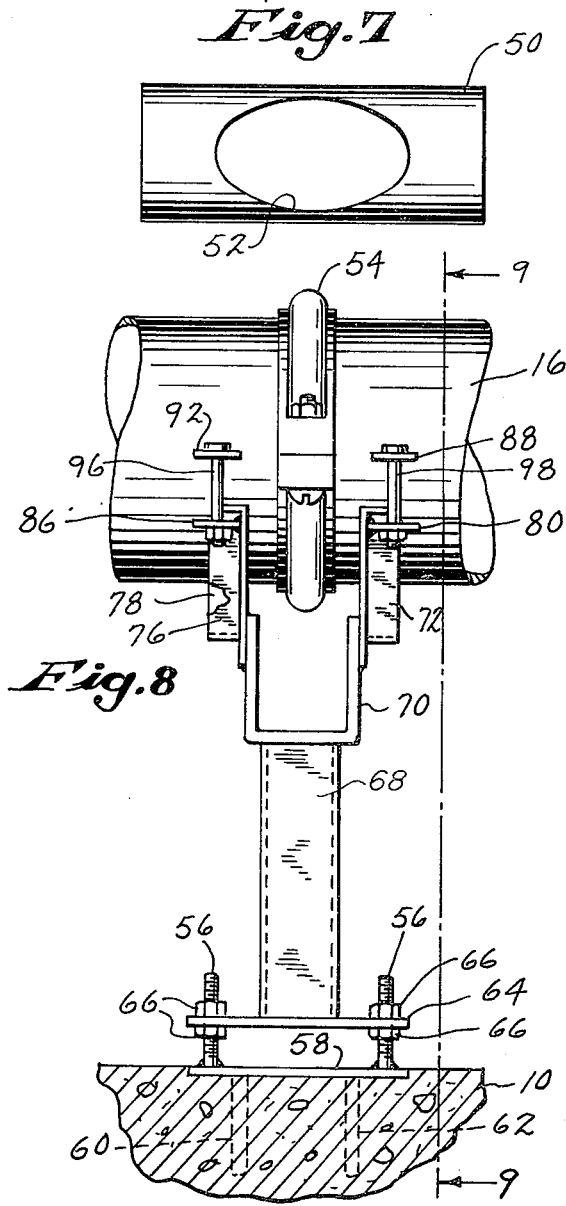
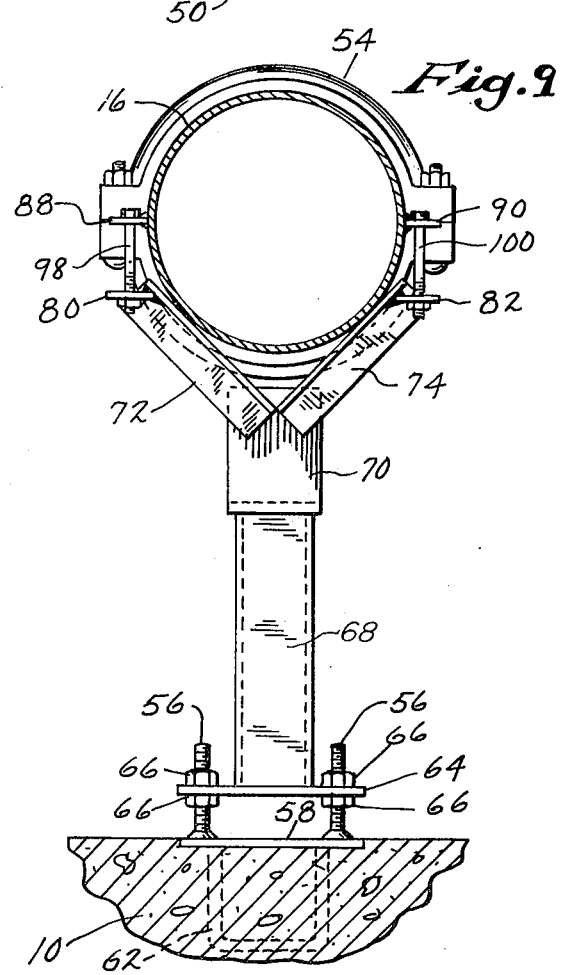

SEWAGE TREATMENT AERATION SYSTEMS

This is a continuation of application Ser. No. 364,585, filed May 29, 1973 and now abandoned.

CROSS-REFERENCE TO RELATED APPLICATIONS

This application discloses subject matter which is common to my prior copending application Ser. No. 168,685, filed Aug. 3, 1971, now U.S. Pat. No. 3,802,676 and Ser. No. 342,586, filed March 19, 1973, and now abandoned, the disclosures of which are hereby incorporated by reference.

BACKGROUND

In sewage treatment plants, the incoming sewage, together with activated sludge, flows progressively and relatively slowly through aerating tanks. Pumps draw air from the atmosphere and force it through header pipes which carry the air along various paths beneath the surface of the liquor. Connectors secured to the headers perform the functions of supporting diffusers at longitudinally spaced points along the headers and passing air from the interiors of the headers to the diffusers. Air bubbles released from the diffusers aerate the liquor, promoting the metabolic processes of the activated sludge, and thus assist in digestion of the sewage.

An early example of connectors is found in U.S. Pat. No. 2,221,346 to A. C. Durdin, Jr. These are internally threaded bosses which project laterally from the header.

In the 1960's underslung headers were promoted and sold by the assignee of the present application. Holes were drilled at longitudinally spaced intervals along the otherwise underformed bottom wall of the header. Inverted cast tees were then welded to the outside of the headers with the bases of the tees in registry with the aforementioned holes. The internally threaded arms of the tees, which extended laterally, received the threaded ends of the diffusers.

In 1971, the present applicant filed an application for patent, Ser. No. 168,685 which was believed to disclose further improvements in connectors. FIGS. 3, 4 4A, 5, 6 and 7 herein are the same as in Ser. No. 168,685. In accordance with one embodiment, disclosed in FIGS. 3, 4 and 4A, transverse underslung connectors were provided with nipples drawn therefrom which were welded to nipples drawn from the bottoms of the headers.

However, according to Ser. No. 168,685, the connector arrangement which was preferred because of expected low resistance to the passage of air was that shown in FIGS. 5, 6 and 7. It was suggested that such connector be produced by making an oval opening in the top of a connector, making a matching oval opening in the bottom of a header, assembling the parts with the oval holes in registry and then welding them together from the outside around the peripheries of the holes.

Other considerations, not discussed in Ser. No. 168,685, reinforced the expectation that the FIGS. 5–7 embodiment would be superior. The oval hole cut in the connector provided a saddle of sorts. The connector, saddled across the header, did not project radially downward from the header to the same extent as the type with nipples (FIGS. 3, 4 and 4A) or the type with the welded tee. Thus, shocks against the arms of the connectors during transportation, handling and operation would exert less leverage on the welds in the FIGS. 5, 6 and 7 embodiment lessening the probability of weld or material failure. Also, the connector and header were in contact with, and welded to, one another through a greater radial angle, suggesting that each would thus do a better job of reinforcing one another than in the previous embodiments.

As was explained in Ser. No. 168,685, the alignment of diffusers in an aeration tank exerts a critical influence on liquor circulation, uniformity of air distribution and aeration efficiency. A 1 inch difference between the elevations of two diffusers on opposite sides of a header, measured at lateral distances of 2 feet from the sides of the header, can produce a very noticeable and significant difference in uniformity of air distribution, especially at low air flow rates, e.g., on the order of 10 scfm per diffuser. Calculations will show that such critical difference in diffuser elevations can occur when the axis of the diffuser diverges from the horizontal by only about 1°. Thus, alignment of connectors is also critical.

Due to difficulties in matching the shape, position and alignment of the oval holes of the saddle type connector embodiment (FIGS. 5–7), and to provide a "land" for welding, it seemed necessary for purposes of achieving minimum acceptable production efficiency and economics to cut the oval opening in the connector smaller than the opening in the header. Consequently, the edge of the smaller opening in the connector protruded into the opening between the header and connector. The edge increased the friction effect of the opening upon the air passing from the header in the connector. Increased head losses were the result, and these can be very significant in the typical aeration system. For instance, for one actual municipal sewage treatment plant, the over-all head loss which could be attributed to the use of the saddle type connectors throughout was computed at about 4 inches of water. Based on a 2 cent per kwh power cost and the use of five 90,000 scfm centrifugal blowers to pump air through the headers, connectors and diffusers, the value of the wasted power was computed at more than $40,000 annually.

Thus, contrary to expectations, the saddle type of connector was not preferable. It suffered from very definite problems both in respect to the efficiency and economics of its production and in respect to the head losses and power wastage it caused.

Accordingly, it is an object of the present invention to provide improved aeration systems in sewage treatment tanks wherein the connectors are convenient to fabricate with the necessary degree of alignment accuracy to foster proper diffuser position and uniform air distribution. Another object is to provide systems which attain the foregoing object while minimizing head losses attributable to header-connector shape and position relationships. Still another object is to provide systems which attain the foregoing objects and nevertheless employ header-connector assemblies of adequate durability to retain their alignment during handling, transportation and use, even if the headers are fabricated of relatively thin wall metal, such as for instance 8 gauge and lighter stainless steel. One or more of these objects, and other objects which will be appreciated by those of ordinary skill in the art, will appear from the disclosure of the present invention which is provided by the accompanying drawings and specification.

SUMMARY OF THE INVENTION

The invention constitutes an improvement upon the known aeration systems which include header means arranged in an aeration tank. The header means are arranged in generally horizontal relationship on any suitable support means. Transverse connectors are secured to the header means at longitudinally spaced locations along the header means for supporting diffusers.

The improvement provided by the present invention may be characterized in that outwardly projecting nipples are provided in the wall of the header at the foregoing spaced locations. These nipples have open ends secured to the open ends of corresponding nipples provided in the walls of said connectors. Upon fabrication and use of such an aeration system, a number of advantages will be evident. These include, among others, ease of fabrication with the necessary degree of connector alignment accuracy for proper diffuser operation and minimization of head losses in the operating plant. When the connectors include a pair of projections extending in opposite directions from the nipples beneath the header, and reinforcing members are secured between said projections and the underside of the header, prefabricated header-connector assemblies will better retain alignment during handling and transportation.

DESCRIPTION OF THE DRAWINGS

FIG. 5 is an enlarged elevational view of a saddle type of connection between the header and connector;

FIG. 6 is a cross-sectional view taken along the line 6—6 of FIG. 5;

FIG. 7 is a plan view of one of the connectors alone, of the type of FIGS. 5 and 6;

FIG. 8 is a enlarged fragmentary elevational view of a supporting structure for the headers shown in FIGS. 1 and 2; and FIG. 9 is a cross-sectional view taken on the line 9—9 of FIG. 8.

DETAILED DESCRIPTION OF THE INVENTION

Figure 1:
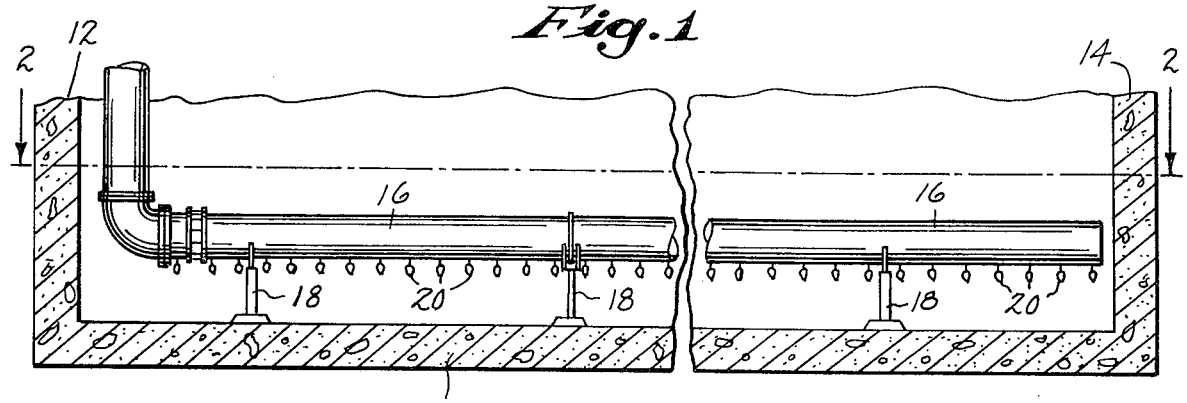
FIG. 1 is an elevational view of a header of this invention installed in a sewage treatment tank, part being broken away.
Figure 2:
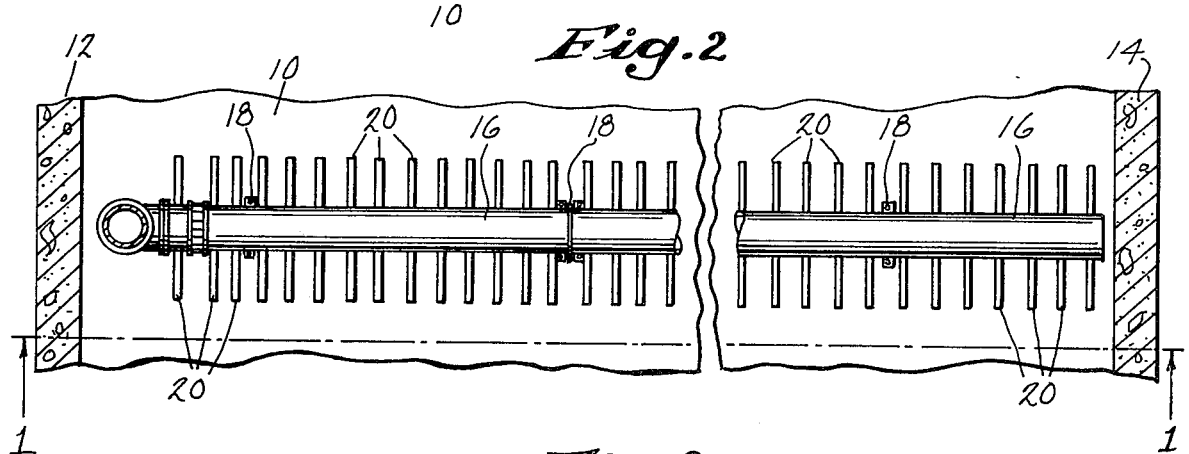
FIG. 2 is a plan view of the header shown in FIG. 1.

Referring to FIGS. 1 and 2, there is shown one header installed in the bottom of a sewage treatment tank. In the practical application of this invention, a plurality of headers may be used in any one sewage treatment tank. One type of installation is disclosed in detail in application Ser. No. 881,709, filed on Dec. 3, 1969, entitled "Apparatus for and Method of Aerating Liquor in Large Sewage Treatment Tanks," now U.S. Pat. NO. 3,615,078, granted Oct. 26,1971. The relationship between the headers and the tank is disclosed in said co-pending patent application. Since the present invention does not deal with the relationship between different headers, only a single header is disclosed in the drawings of this application.

In FIGS. 1 and 2, the sewage treatment tank is represented by a concrete floor 10 and two concrete side walls 12 and 14. The header 16 is supported on the bottom 10 of the tank by means of supporting members 18 to be hereinafter described in greater detail. Projecting from both sides of the header 16 are diffusers 20 which are attached to opposite ends of diffuser connectors 22. In certain header installations, such as near a wall, there may be a diffuser at one end only of a connector. The detailed construction of diffusers 20 is described in U.S. Pat. No. 3,424,443, which was issued on Jan. 28, 1969, for an "Apparatus for Diffusing Gas into a Liquid."

This invention is principally concerned with an aeration system in which headers 16 and connectors 22 are related in such a way as to foster accurate positioning of the headers 16 and diffusers 20 in a predetermined horizontal plane at the proper location to produce the desired circulatory effect on the liquor in the sewage treatment tank.

Figure 3:
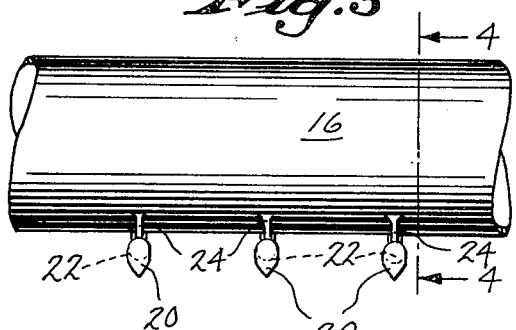
FIG. 3 is an enlarged elevational view of a portion of the header shown in FIGS. 1 and 2.
Figure 4:
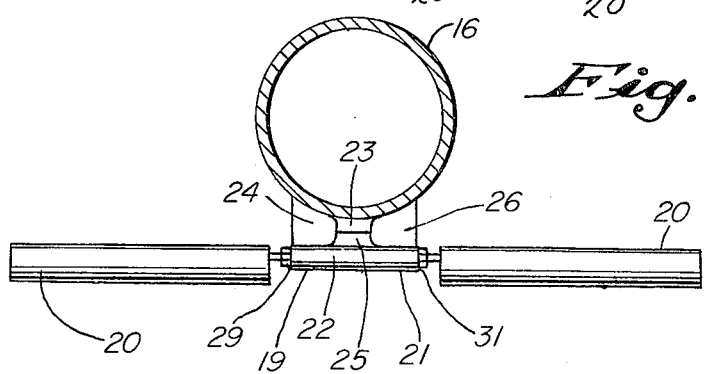
FIG. 4 is a cross-sectional view taken along the line 4—4 of FIG. 3.
Figure 4A:
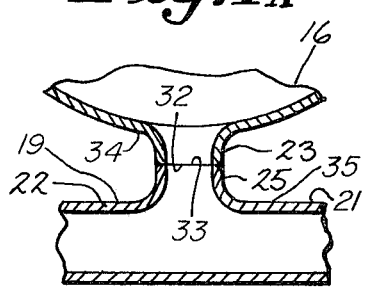
FIG. 4A is an enlarged fragmentary cross-sectional view of the joint between the header and diffuser.

In accordance with one embodiment of the invention, the connectors 22 are prefabricated in position on the headers 16 as shown in FIGS. 3, 4 and 4A, with the connectors 22 being accurately aligned with the other connectors 22 and being held in position by brackets 24 and 26, which are cut to accurately fit in the space between connectors 22 and header 16, and are then welded in position to maintain each connector 22 in its proper orientation with respect to the axis of header 16. As shown in FIGS. 4 and 4A, the connectors 22 have nipples 25 drawn therefrom which are welded to short nipples 23 drawn from the bottom of the header 16. Brackets 24 and 26 may be adjacent to the nipples or spaced therefrom, and thus may be secured to part of or substantially the entire length of the connector projections.

Upon examining FIGS. 1 through 4A of the drawings in greater detail, it will be seen that the aeration system comprises header means 16. The latter is arranged in a sewage treatment tank 10, 12 and 14 in generally horizontal relationship, as shown in FIG. 1. A plurality of horizontally disposed connectors 22 is welded at longitudinally spaced locations along the length of and beneath header means 16 as shown in FIG. 3. These connectors each include two projections 19 and 21, best seen in FIG. 4A, which extend horizontally and transversely of the header 16. As FIG. 4 also shows, these projections extend in opposite directions beneath the underside of the header 16 and preferably terminate in first and second free threaded ends 29 and 31 into which the threaded ends of diffusers 20 may be screwed. Between their respective threaded ends, the connectors 22 are secured to the underside of the header means. Moreover, they are adapted to receive and support corresponding threaded ends of diffusers 20 with the diffusers attached to any given connector 22 being accurately aligned with (in the same plane as) diffusers attached to other such connectors.

FIGS. 3 and 4A show that the invention differs from known aeration systems by virtue of having a header means 16 which includes a plurality of outwardly, including downwardly, projecting open-ended nipples 23 at the aforesaid said spaced locations. The header means, which may include a tube of circular or other cross-section, may be of metal, e.g., stainless steel. When the metal is of thin guage relative to the tube diameter, the metal may be drawn. Thus, the nipples 23 may be formed by drawing and when so formed will be composed of integral, arcuate cross-section extensions of the header tube wall material. As best seen in FIG. 4A, the header nipples 23 may terminate in a planar face 32 which is perpendicular to the nipple axis and parallel to the longitudinal header tube axis. In most instances, this face 32 will be spaced downwardly from the outside diameter 34 of the header tube.

FIG. 3 shows that the connectors 22 may be tubes of circular cross-section. As FIG. 4A shows, these also have an outwardly, including upwardly, projecting open-ended nipple 25. FIG. 4 shows that the nipple is formed intermediate the ends 29 and 31 of the connector. When the connector tube is of drawable metal, the nipple may be drawn and thus composed of integral arcuate cross-section extensions of the connector tube wall material. The nipple may terminate in a planar face 33 which is perpendicular to the nipple axis and parallel to the longitudinal connector tube axis. In most instances, face 33 will be spaced upwardly from the top 35 of the connector tube.

It will be seen in FIG. 4A that the planar faces 32 and 33 on the header nipple 23 and connector nipple 25 engage one another face-toface. The nipples are welded to each other in registry to provide a smooth transition between the inner surfaces of the header nipples 23 and connector nipples 25.

When the connector tube 22 is located entirely below and spaced downwardly from the bottom of the header tube 16, as shown in FIGS. 3, 4 and 4A, open areas or spaces are provided which lie between the tops of connector tube projections 19 and 21 (FIG. 4A) and any portion of the arcuate underside of the header 16 which is above the projections. As seen in FIG. 4, vertically disposed reinforcing members, such as the aforementioned brackets 24 and 26, may be welded to and extend between the underside of the header tube and the two connector tube projections through these open areas or spaces. As FIG. 4 also shows, these reinforcing members may if desired be secured to substantially the entire length of connector projections 19 and 21, filling substantially all of that portion of the space between said projection and header 16 which is adjacent nipples 23 and 25. However, in the presently preferred embodiments, the reinforcing members are spaced laterally from the nipples and are therefore secured to only a portion of the length of the connector projections 19 and 21.

In the fabrication of assemblies of headers and connectors to be used in the present invention, it is preferable to use precision fixtures so that the connectors will be attached to the headers very accurately with respect to their alignment relative to the header axis and to each other. When the parts are supported properly and welded with good technique, heat is adequately dissipated, and the joint between the nipples is not strongly prone to distortion or stress retention. This is in contrast to what has been experienced with the saddle type connector shown in FIGS. 5–7, which is not included in the present invention.

In the fabrication of the saddle type connector of FIGS. 5, 6 and 7, a straight connector tube 50 has an oval-shaped opening 52 cut therein and a matching oval-shaped opening 53 is cut into a header 17. The connector 50 is then joined to the header 17 by placing the two oval cut-outs together and welding the connector 50 to the header 17 along the juncture of the connector and the header. The connector tube diameter is thus held substantially tangential to the header tube diameter. When attempting to fabricate head connector assemblies of stainless steel tubes in thickness considered both practical for drawing and economical for use in the headers of sewage aeration systems, fabrication problems were encountered. The diameter of headers conventionally diminishes step-wise at progressively greater distances from the air supply while the bottoms of the header sections and the connectors are respectively held at uniform elevations. The use of the saddle type connectors in such systems introduces a requirement for a variety of different oval hole forming tools or individual hand shaping of such holes. Even then, difficulties are involved in providing openings of uniform area between the headers and connectors, making it difficult to provide uniform air distribution to all connectors. The long weld around the peripheries of the large oval holes in the header and connector tubes, although seemingly offering the possibility of a stronger and better assembly, tended to distort the header tube walls and/or build stresses therein. This in turn impaired connector alignment and/or the potential durability of the parts. Problems of this type are inherently less prevalent in the fabrication of assemblies with welded nipples as disclosed in FIGS. 1 through 4A. Also, when applying brackets 24 and 26 to the FIGS. 1–4A assembly, it has been found that less difficulty is encountered with heat dissipation, distortion and stresses than when trying to build in strength with a long weld around large oval holes in a saddle type connector. Opportunities are available for realignment and cooling of the work between the required welding steps, e.g., welding the nipples together, welding the brackets to the header, and welding the brackets to the connectors.

FIGS. 8 and 9 show an example of support means for supporting the header in the tank. The illustrated support is positioned at a joint between two sections of the header 16 which are joined together by an airtight clamp 54 which can be any suitable type of prior art clamp that will provide an airtight joint between the two header sections. The bottom of the header support rests on four bolts 56 which project upwardly from a floor plate 58 which is cast into the concrete floor 10 of the sewage treatment tank and secured therein by two downwardly depending U-shaped members 60 and 62. A bottom plate 64 having four openings formed therein is adjustably disposed upon the bolts 56 by means of nuts 66 which are positioned both below and above the plate 64. An I-beam or a pipe 68, as shown in FIGS. 8 and 9 is attached to the center of the plate 64 and supports a U-shaped bracket 70 which supports two V-shaped cradles comprising the arms 72, 74, 76, and 78. Each of the arms 72, 74, 76, and 78 is fitted at the upper extremity of the arm with corresponding horizontal lugs 80, 82, and 86, and a fourth lug which is behind lug 82 in FIG. 9. Each of the lugs 80, 82, and 86 has an opening therein to receive a bolt which depends downwardly from matching lugs 88, 90, and 92, all of which are welded to the sides of header 16. The lugs 88, 90, and 92 have openings therein for receiving bolts 96, 98, and 100. A fourth bolt which cannot be seen in the drawings engages a pair of lugs like the lugs 90 and 82, behind bolt 100 in FIG. 9 and on the other side of the pipe from bolt 96 in FIG. 8. The bolts 96, 98, 100 and the unnseen bolt provide a means of rotating the headers 16 about their longitudinal axis during the installation process so as to align the axis of the connectors attached thereto in the horizontal plane. The bolts 56 which project up from the floor plate 58 provide a means of leveling the base support of the header 16 both vertically and horizontally. The invention is not limited to this type of support; and any suitable support may be used.

In the fabrication and use of the invention, one may (a) prefabricate the header 16 with the connectors 22 welded onto the header 16 at spaced longitudinal positions along the header, with all of the connectors 22 in the same plane with each other and each connector extending perpendicular to the axis of header 16; (b) place the prefabricated header 16 and connectors 22 within the tank and supporting it within the tank in a predetermined horizontal position; and (c) screw the diffusers 20 onto the connectors 22, usually after the connectors 22 have been horizontally aligned, so that the diffusers 20 will be horizontally aligned when they are installed. As subsidiary steps within the major steps noted above, one may also include the steps of leveling the header and rotating the header about its axis to level the connectors.

From the foregoing description it can be seen that this invention provides improved aeration systems for sewage treatment tanks. And, although the invention has been described with reference to certain embodiments, it should be understood that the invention is by no means limited to the disclosed embodiments since modifications can be made in the disclosed structure without departing from the fundamental principles of operation thereof. For example, although the header described in this application has diffusers extending from both sides, it will be clear that in some applications it may be either necessary or desirable to have the diffusers extending from one side only of the header. In addition, although the disclosed supports 18 for the header utilize two V-shaped cradles to hold the headers, it may be desirable in some applications to utilize supports having only one V-shaped cradle. These and many other modifications will be apparent to those skilled in the art, and this invention includes all such modifications falling within the scope of the following claims.

What is claimed is:

1. A prefabricated header-connector assembly adapted for inclusion in a sewage aeration tank by the attachment of a low pressure air supply and diffusers to a plurality of interconnected header-connector assemblies in which said assembly maintains said attached diffusers in proper alignment in a common plane, said assembly comprises;
   a header formed of weldable material capable of having nipples drawn therefrom, a plurality of outwardly projecting nipples drawn from said header at spaced locations on said header,
   a plurality of connectors each secured to said header at different ones of said spaced locations, each of said connectors oriented in a transverse direction to the direction of said header, said connectors having coupling means for coupling to diffusers,
   each of said connectors having nipples drawn therefrom with the open end of said connector nipples welded to different ones of said header nipples.

2. The assembly of claim 1 which further includes a plurality of reinforcing means secured to said header and to different ones of said connectors for maintaining the orientation between said connectors and said header.

3. The assembly of claim 2 in which said reinforcing means includes at least one reinforcing member for each connector, welded to said connector and said header.

4. The assembly of claim 3 in which said at least one reinforcing member is welded to said header over the entire surface of said member contacting said header.

5. The assembly of claim 3 in which said at least one reinforcing member is welded to said connector over the entire surface of said member contacting said connector.

6. The assembly of claim 2 in which said reinforcing means includes a pair of reinforcing members for each connector, welded to said connector and said header.

7. The assembly of claim 6 in which both said header and connector are of circular cross-section, each with an axis, each reinforcing member welded to said connector surface in a plane of said connector axis and on opposite sides of said header axis.

8. An aeration system comprising header means arranged in an aeration tank on support means in generally horizontal relationship, with transverse horizontally disposed connectors secured to said header means at longitudinally spaced locations along said header means for supporting diffusers, the improvement characterized in that;
   said header means is a tube comprising weldable material capable of having nipples drawn therefrom, and including outwardly protruding nipples at said spaced locations composed of integral arcuate cross-section extentions of the header-tube wall material and terminating in a planar face,
   said connectors are tubes including outwardly projecting nipples composed of integral arcuate cross-section extensions of the connector-tube wall material terminating in a planar face,
   the planar faces of said header nipples and said connector nipples engaging each other, and
   said nipples being welded together in register to provide a smooth transition between the inner surfaces of the header nipples and the connector nipples.

9. The aeration system of claim 8 wherein said connectors project transversely and horizontally in opposite directions from said nipples beneath the underside of said header means, with vertically extending reinforcing members welded to and extending between the underside of said header means and the projections of said connectors.

* * * * *